N. Tufts Jr,
Gas Meter,
Nº 29,639.  Patented Aug. 14, 1860.
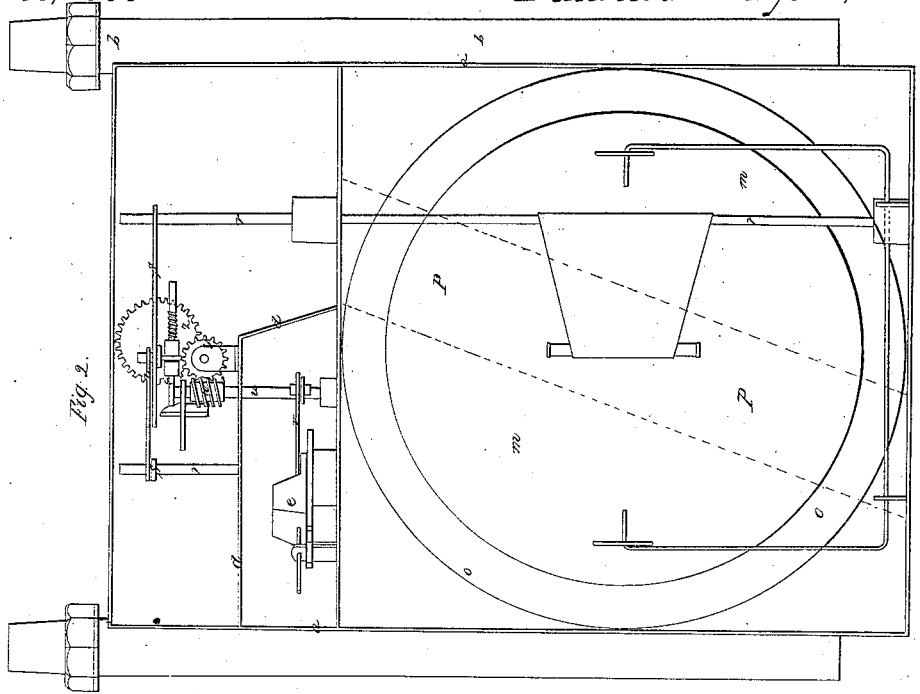
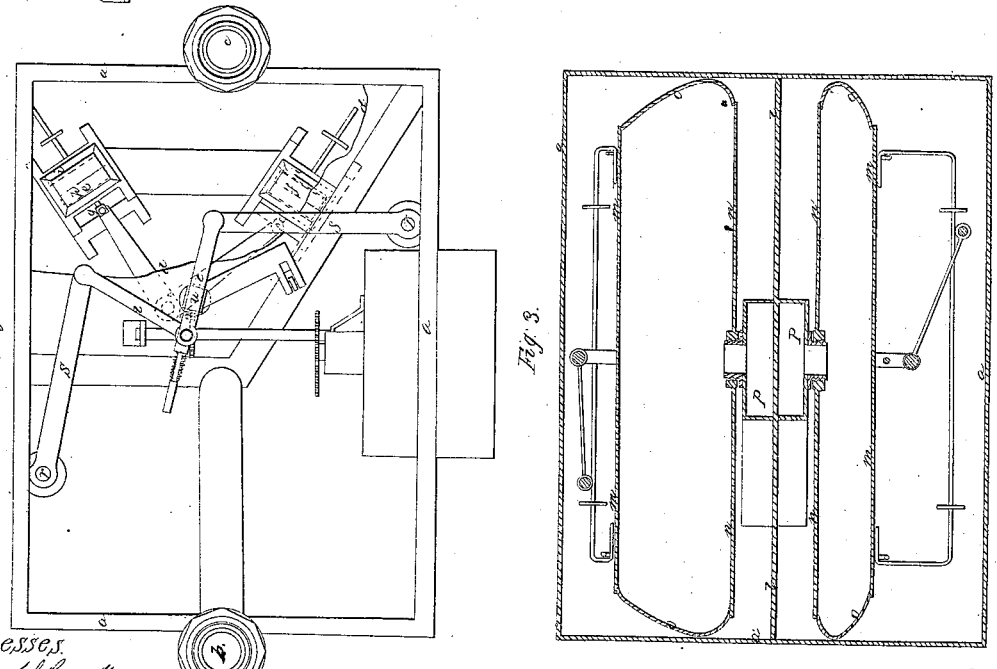
Witnesses
Joseph Gavett
H. W. Brown
Inventor
Nathaniel Tufts Jr

UNITED STATES PATENT OFFICE.

NATHANIEL TUFTS, JR., OF BOSTON, MASSACHUSETTS.

IMPROVEMENT IN GAS-METERS.

Specification forming part of Letters Patent No. 29,639, dated August 14, 1860.

*To all whom it may concern:*

Be it known that I, NATHANIEL TUFTS, Jr., of Boston, in the county of Suffolk and State of Massachusetts, have invented certain new and useful Improvements in Gas-Meters; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The figures of the accompanying plate of drawings represent my improvements.

Figure 1 is a plan or top view. Fig. 2 is a side elevation. Fig. 3 is a horizontal transverse section.

My improvements relate to that class of apparatus for measuring gas called "dry gas-meters," in which the gas passing through the same is caused to be registered by the operation of two diaphragms or chambers having rigid heads and flexible sides—like a bellows, for instance—the movements of which diaphragms or chambers, by their alternate inflation and collapsion, impart, by means of suitable devices, a continuous motion to suitable indicating-hands.

Previous to my invention the movable diaphragms or bellows have been rigidly attached to a central partition separating them in the apparatus, the mode of attaching them being necessarily as follows: The leather or other material of which the flexible sides are to be formed was first fastened to two rings of metal, one of which was then firmly soldered to the central partition before spoken of. The other ring, or the front one, was then fastened by soldering to an annular plate which constituted the head of the bellows, which was thus, it will be seen, made to form a part of the apparatus itself and could not be removed without unsoldering the rings. This mode has been found in practice liable to serious objections. In the first place, leaks very commonly occur either in the bellows or in some portion of the machinery of the apparatus, but in which of these it is impossible to ascertain to a certainty without first unsoldering and taking out the bellows to test it, the inconvenience and expense of which will be apparent. Secondly, the leather of the bellows often contains such small apertures and weak places that its imperfections cannot be found out until it has been secured as aforesaid and commenced to operate in the meter, as it cannot be tested beforehand and does not constitute a bellows until it is inserted in and becomes a part of the meter itself. Thirdly, as the soldering by means of the hot soldering iron or tool used by the workman both in securing and removing the bellows is necessarily applied after the leather is secured to the rings, and therefore comes in close proximity thereto, its heat often seriously damages the leather by scorching and burning the same, forming weak spots, which often are not detected until subjected to the pressure of the gas in the meter.

To overcome these objections is the object of the present invention, which consists in forming the bellows in such a manner that it can be readily removed from or inserted in the meter at pleasure without soldering or unsoldering. I effect this result by forming the bellows with two heads or annular plates, to which the leather or other flexible material is secured in any proper manner previous to being inserted in the meter, the rear plate or head having a female screw formed in it, which fits over a corresponding male screw attached to the pipe or connection through which the gas is admitted to the bellows; or it may be secured to the said pipe or connection by any other means that will permit of its being quickly and readily connected with or disconnected from the said pipe or connection without the necessity of soldering or unsoldering. By this means it will be seen that by thus forming the bellows with two full annular plates, each of which is entirely independent of the meter itself, the bellows can be entirely finished before being inserted in the apparatus, and therefore can be fully tested before it is put into use, and also that this mode of construction allows of the bellows being secured to the meter or removed therefrom almost instantaneously and without the necessity of soldering or unsoldering—the great objections to which have been hereinbefore stated—the distinctive feature between my improvement and the old method being that in the former case the bellows is entirely independent of the meter, and in the latter it forms a part thereof and does not become a bellows until permanently attached thereto.

I will next proceed to describe my improvements in detail.

*a a a a* in the drawings represent the casing or box of an ordinary dry gas-meter; *b b*, the inlet-pipe for the gas, and *c c* the outlet-pipe, through which the gas passes as fast as it has been measured. The gas that enters the pipe *b b* passes into a chamber, *d d*, (represented as uncovered in the drawings,) containing two sliding valves, *e f*, each traveling back and forth over three ports, *g h i*, one set of ports communicating with one of the two compartments, into which the meter is divided by a central partition, *l l*, and the other set of ports with the remaining compartment. Each of the valves *e f* so operates that the gas first passes down one of the three ports into the interior of the bellows, and then, this port being closed, down another port into one of the compartments in which the bellows are placed, and around the outside of the same, the object being first to inflate the bellows and then displace the gas therein by outside pressure, this being the ordinary well-known method practiced in dry gas-meters, and in my apparatus the play and arrangement of the valves, &c., being precisely like those in other gas-meters, need not be herein particularly described.

The bellows is represented in the drawings at Fig. 3, and consists of two annular plates or heads, *m n*, connected together by flexible leather, *o*, fastened in any suitable manner to the rims thereof. In the center of the rear plate or head is formed a female screw or bushing that is screwed over a hollow male screw projecting from and communicating with a pipe or tube, *p p*, leading to and communicating with two of the ports of both of the valves *e f*. Thus, for instance, when the port *g* of the valve *e* is open gas will pass down that port through the tube *p p* and the central aperture in the back plate, *n*, of the bellows, thereby inflating the same, when the port *i* opens and allows gas to pass down the same and around the outside of the bellows, thereby displacing the gas within the bellows by outside pressure, and permitting the internal gas to pass upward through the valve *g* and thence through the central port, *h*, (the valve *e* being of the usual hollow box form,) into the outlet-pipe. The gas around the exterior of the bellows on its being inflated again in the same manner passes upward through the port *i* into the central port, *h*, and out of the outlet-pipe *c c*, and so for both bellows and valves, the two bellows alternating in their movements so as to keep up a continuous supply of gas. The movements of the bellows are transmitted to the valves *e f* and to the index-hands in the usual manner by means of two rocker-shafts, *r r*, that so actuate right-angular arms *s s t t* as to give a rotary motion to a shaft, *u*, that moves the valves *e f* by means of a crank on the lower end of the said shaft and the arms *v v*. On the shaft *u* is a worm, *w*, engaging with a pinion, *x*, on the same shaft with another pinion, *y*, that turns a gear, *z*, through which motion is communicated to the train of wheels that actuate the indicating-hands.

The above-described arrangement of the bellows and its connection with the pipe *p p*, through which it receives the gas, permits, it will be seen, of its being readily inserted in or removed from the meter simply by screwing it onto the male screw on the pipe *p p*, or by unscrewing it therefrom, thereby avoiding the necessity of soldering or unsoldering, and constituting a complete bellows before its insertion in the meter, whereby it can be fully tested before being put in operation, and easily removed and replaced in case it needs repairs or inspection.

It will be evident that the back plate of the bellows can be secured to the pipe *p p* by other means than those described—by gas-tight couplings, for instance—it being only necessary for the purposes of my invention that the connection of the bellows with its supplying-pipe should be of such a nature as to admit of its easy connection with or disconnection therefrom.

Having thus described my improvements, what I claim as my invention, and desire to have secured to me by Letters Patent, is—

In combination with the supplying-pipe *p p*, the double-headed independent bellows connected at its rear head or plate with the said pipe by a screw-joint or otherwise, as set forth.

NATHANIEL TUFTS, Jr.

Witnesses:
JOSEPH GAVETT,
A. N. BROWN.